United States Patent
Yang et al.

(10) Patent No.: US 9,821,812 B2
(45) Date of Patent: Nov. 21, 2017

(54) TRAFFIC COMPLEXITY ESTIMATION

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US); Fling Finn Tseng, Ann Arbor, MI (US); Roger Arnold Trombley, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/694,230

(22) Filed: Apr. 23, 2015

(65) Prior Publication Data

US 2016/0314690 A1    Oct. 27, 2016

(51) Int. Cl.
*G08G 1/09* (2006.01)
*B60W 40/04* (2006.01)
*G08G 1/16* (2006.01)

(52) U.S. Cl.
CPC .............. *B60W 40/04* (2013.01); *G08G 1/166* (2013.01); *G08G 1/167* (2013.01)

(58) Field of Classification Search
CPC .. G08G 1/096791; G08G 1/166; G08G 1/167; B60W 40/04
USPC ........................................................ 340/905
See application file for complete search history.

(56) References Cited

U.S. PATENT DOCUMENTS

| | | | |
|---|---|---|---|
| 7,363,155 B2* | 4/2008 | Meister | B60K 31/0008 340/436 |
| 8,718,861 B1 | 5/2014 | Montemerlo et al. | |
| 8,849,512 B2* | 9/2014 | Filev | B60W 50/087 701/36 |
| 8,897,948 B2* | 11/2014 | Caveney | G08G 1/0104 340/438 |
| 2006/0235615 A1 | 10/2006 | Kato | |
| 2013/0179047 A1* | 7/2013 | Miller | B60W 30/09 701/70 |
| 2013/0286193 A1* | 10/2013 | Pflug | B60R 1/00 348/135 |
| 2014/0136044 A1* | 5/2014 | Conrad | B60W 30/09 701/23 |

(Continued)

FOREIGN PATENT DOCUMENTS

| | | |
|---|---|---|
| DE | 102007018517 | 10/2008 |
| DE | 102009033853 A1 | 5/2010 |

(Continued)

OTHER PUBLICATIONS

GB Search Report, 15537P/GB, Appl No. GB1607035.1, dated Oct. 18, 2016.

*Primary Examiner* — Zhen Y Wu
(74) *Attorney, Agent, or Firm* — Frank A. MacKenzie; Bejin Bieneman PLC

(57) ABSTRACT

A vehicle system includes at least one environmental sensor and a processing device. The environmental sensor is programmed to collect traffic information. The processing device is programmed to receive the traffic information, generate a traffic complexity index based at least in part on the traffic information, compare the traffic complexity index to a predetermined threshold, and generate a traffic alert signal if the traffic complexity index exceeds the predetermined threshold.

16 Claims, 3 Drawing Sheets

(56) References Cited

U.S. PATENT DOCUMENTS

| | | | |
|---|---|---|---|
| 2015/0194055 A1* | 7/2015 | Maass | B60W 50/14 340/905 |
| 2015/0278611 A1* | 10/2015 | Chi | G06K 9/00798 348/148 |
| 2015/0329111 A1* | 11/2015 | Prokhorov | B60W 10/18 701/41 |
| 2016/0039411 A1* | 2/2016 | Park | G01S 13/87 701/70 |
| 2016/0052515 A1* | 2/2016 | Choi | B60W 30/0953 701/1 |

FOREIGN PATENT DOCUMENTS

| | | |
|---|---|---|
| DE | 102012009822 | 11/2012 |
| DE | 10201322294 | 6/2014 |
| DE | 102012112296 A1 | 6/2014 |
| DE | 102012112802 | 6/2014 |
| EP | 2138987 | 12/2009 |
| EP | 2940545 | 11/2015 |
| GB | 2373619 | 9/2002 |
| WO | 2013034347 | 3/2013 |

\* cited by examiner

TRAFFIC COMPLEXITY ESTIMATION

BACKGROUND

Driving demand and driver workload refer to the amount of attention a driver must give to operating a vehicle. Driving demand is high, for example, in areas with greater vehicle traffic, pedestrian traffic, or both. A driver may give more attention to operating the vehicle when driving demand is high, thereby increasing driver workload. The driver's attentiveness may instinctively increases as more vehicles and pedestrians are around.

DETAILED DESCRIPTION

Driving demand and workload may be directly related to the number of vehicles near a host vehicle. As the number of surrounding vehicles increases, driving demand may increase. The direction of travel of surrounding vehicles as well as the proximity and speed of the surrounding vehicles relative to the host vehicle may further increase driving demand and workload. With regard to direction of travel, surrounding vehicles travelling laterally relative to the host vehicle may increase driving demand and workload more than surrounding vehicles travelling in the same direction as the host vehicle.

Human drivers are relied upon to determine the level of driving demand necessary to adequately operate the vehicle in a non-autonomous mode. Autonomous and semi-autonomous vehicles seek to relieve the driver of certain driving-related tasks. One consequence of autonomous and semi-autonomous vehicles, therefore, may result in the driver not being as attentive as if he or she were manually operating the vehicle. Therefore, a host vehicle operating in an autonomous or semi-autonomous mode may generate an alert when driving demand increases. The alert may serve to increase the driver's engagement in the operation of the host vehicle.

An example vehicle system that can monitor driving demand and predict when driver engagement should be elevated based, e.g., on an increase in driving demand may include at least one environmental sensor and a processing device. The environmental sensor is programmed to collect traffic information. The processing device is programmed to receive the traffic information, generate a traffic complexity index based at least in part on the traffic information, compare the traffic complexity index to a predetermined threshold, and generate a traffic alert signal if the traffic complexity index exceeds the predetermined threshold. The traffic alert signal may alert the driver when driving demand increases. In some instances, the traffic alert signal may alert the driver to assume control of a vehicle operating in an autonomous mode.

The elements shown may take many different forms and include multiple and/or alternate components and facilities. The example components illustrated are not intended to be limiting. Indeed, additional or alternative components and/or implementations may be used.

Figure 1:
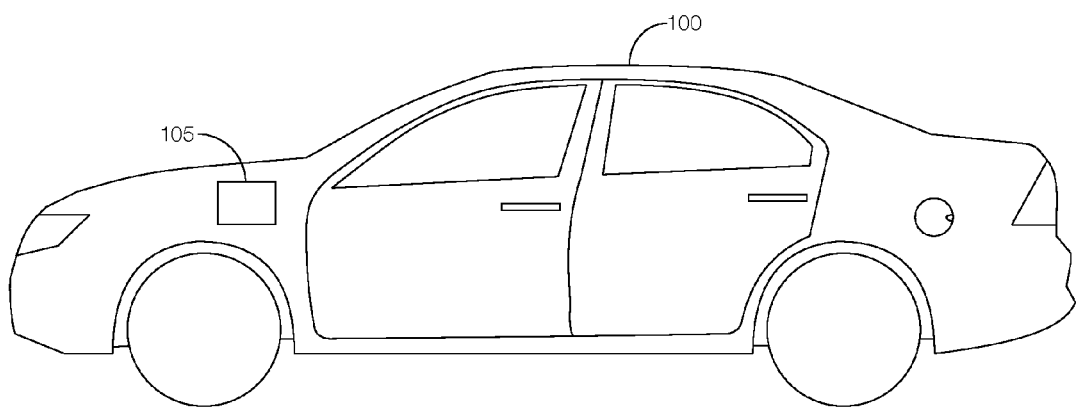
FIG. 1 illustrates an example vehicle with a vehicle system programmed to predict a change in driving demand.

As illustrated in FIG. 1, the host vehicle 100 includes a demand prediction system 105 programmed to monitor traffic information and predict driving demand based on the traffic information. Examples of traffic information may include the number of surrounding vehicles, the direction of travel of the surrounding vehicles, etc. If driving demand increases, the demand prediction system 105 may be further programmed to output an alert signal. When presented to the driver, the alert signal may notify the driver to increase his or her attentiveness to the surrounding vehicles and general operation of the host vehicle 100.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, as discussed below, the host vehicle 100 is an autonomous vehicle configured to operate in an autonomous (e.g., driverless) mode, a partially autonomous mode, and/or a non-autonomous mode.

Figure 2:
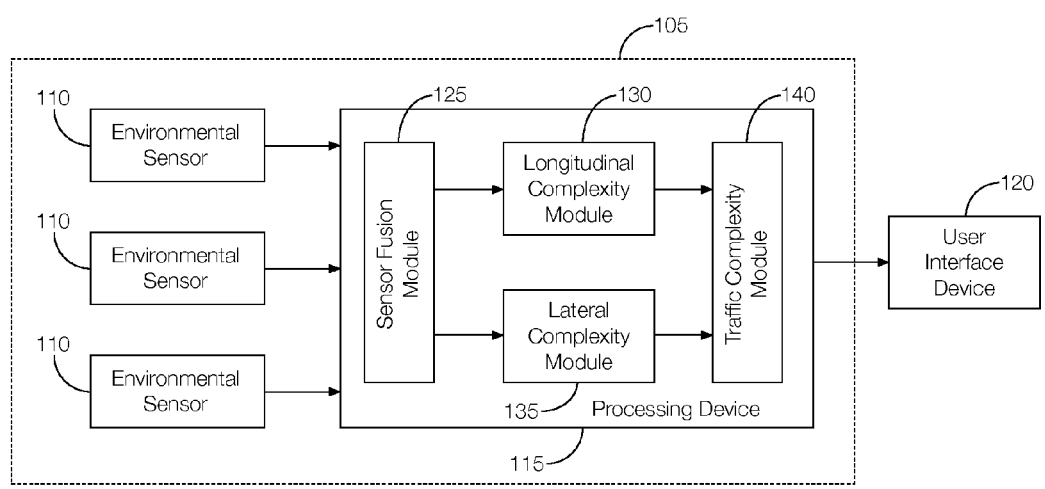
FIG. 2 is a block diagram of the vehicle system shown in FIG. 1.

Referring to FIG. 2, the demand prediction system 105 may include at least one environmental sensor 110 and a processing device 115. A user interface device 120 may further be incorporated into the demand prediction system 105 or otherwise located in a passenger compartment of the host vehicle 100. The user interface device 120 may include any electronic device located in the passenger compartment of the host vehicle 100 and programmed to present information to a user, such as a driver, during operation of the vehicle. Moreover, the user interface device 120 may be programmed to receive user inputs during operation of the host vehicle 100. In some possible approaches, the user interface device 120 may include a touch-sensitive display screen. The user interface device 120 may be programmed to receive signals from the processing device 115. In response to some signals, as discussed in greater detail below, the user interface device 120 may be programmed to output an alert to the driver. The alert may include an audible alert, a visible alert, a tactile alert, or the like.

The environmental sensors 110 may include any number of devices configured or programmed to generate signals that help navigate the host vehicle 100 while the host vehicle 100 is operating in an autonomous (e.g., driverless) or semi-autonomous mode. Examples of environmental sensors 110 may include a radar sensor, a lidar sensor, a vision sensor such as a camera, or the like. The environmental sensors 110 help the host vehicle 100 "see" the roadway, surrounding vehicles, etc. The environmental sensors 110, therefore, may help the host vehicle 100 navigate various obstacles while the host vehicle 100 is operating in the autonomous or semi-autonomous mode.

The environmental sensors 110 may be programmed to collect traffic information. The traffic information may include the number of surrounding vehicles, the direction of travel of the surrounding vehicles, other movement of the surrounding vehicles, etc. The environmental sensors 110 may be programmed to monitor longitudinal movement of the surrounding vehicles, lateral movement of the surrounding vehicles, the speed of the surrounding vehicles, and the proximity of the surrounding vehicles relative to the host vehicle 100. The environmental sensors 110 may be programmed to output signals representing the traffic information collected.

The processing device 115 may be programmed to receive traffic information from the environmental sensors 110, determine traffic complexity, and predict whether the traffic information suggests increased driving demand and workload. The processing device 115, as shown, includes a sensor fusion module 125, a longitudinal complexity module 130, a lateral complexity module 135, and a traffic complexity module 140.

The sensor fusion module 125 may be programmed to receive and aggregate signals output by the environmental sensors 110. The sensor fusion module 125 may be further programmed to separate the traffic information into longitudinal complexity values and lateral complexity values. The longitudinal complexity values may represent the longitudinal movement of surrounding vehicles. The longitudinal complexity values may be provided to the longitudinal complexity module 130. The lateral complexity values may represent the lateral movement of surrounding vehicles. The lateral complexity values may be provided to the lateral complexity module 135.

The longitudinal complexity module 130 may be programmed to aggregate the longitudinal complexity values output by the sensor fusion module 125. The operations of the longitudinal complexity module 130 are discussed in greater detail below with regard to FIG. 3. The longitudinal complexity module 130 may output a longitudinal complexity index to the traffic complexity module 140.

The lateral complexity module 135 may be programmed to aggregate the lateral complexity values output by the sensor fusion module 125. The operations of the lateral complexity module 135 are discussed in greater detail below with regard to FIG. 4. The lateral complexity module 135 may output a lateral complexity index to the traffic complexity module 140.

The traffic complexity module 140 may generate the traffic complexity index from the longitudinal complexity index and the lateral complexity index. Thus, the traffic complexity index is based at least in part on the traffic information. In generating the traffic complexity index, the traffic complexity module 140 may be programmed to weigh the lateral complexity value greater than the longitudinal complexity value since, e.g., lateral movement of surrounding vehicles may suggest greater driving demand than longitudinal movement of surrounding vehicles. Alternatively, the traffic complexity module 140 may be programmed to weigh the longitudinal complexity value greater than the lateral complexity value. In addition to assigning weighted values to the longitudinal and lateral complexity values, the traffic complexity module 140 may further weigh the proximity of surrounding vehicles. That is, movement of surrounding vehicles closer to the host vehicle 100 may be given a higher weight than movement of surrounding vehicles further from the host vehicle 100.

Further, the traffic complexity module 140 may compare the traffic complexity index to a predetermined threshold. If enough of the values of the traffic complexity index exceed the predetermined threshold, or if enough of the values of the traffic complexity index exceed the predetermined threshold by a minimum amount, the traffic complexity module 140 may predict an increase in driving demand and driver workload. In response to predicting an increase in driving demand, the traffic complexity module 140 may generate a traffic alert signal. The traffic alert signal may indicate that a situation requiring increased driving demand has been detected. The traffic complexity module 140 may output the traffic alert signal to the user interface device 120. The traffic alert signal may command the user interface device 120 to present an alert to the driver. The alert may include an audible alert, a visible alert, a tactile alert, or the like.

Accordingly, the processing device 115 may be programmed to receive the traffic information, generate the traffic complexity index based at least in part on the traffic information, compare the traffic complexity index to the predetermined threshold, and generate the traffic alert signal if the traffic complexity index exceeds the predetermined threshold. Using the traffic complexity index, therefore, the processing device 115 may be programmed to predict driving demand.

Figure 3:
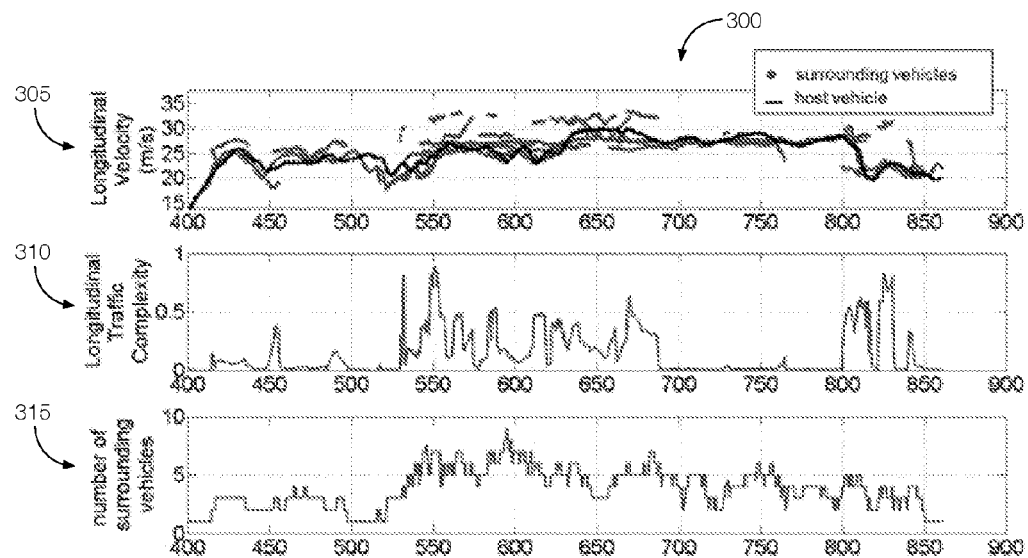
FIG. 3 illustrates example graphs related to estimating a longitudinal component of a traffic complexity index.

FIG. 3 illustrates example graphs 300 related to estimating a longitudinal component of a traffic complexity index. The graphs 300 include a longitudinal velocity graph 305, a longitudinal traffic complexity graph 310, and a number of surrounding vehicles graph 315. The longitudinal velocity graph 305 may represent values associated with the longitudinal speeds of the surrounding vehicles, the host vehicle 100, or both. The longitudinal traffic complexity graph 310 may represent the instantaneous longitudinal complexity values of the surrounding traffic relative to the host vehicle 100. The number of surrounding vehicles graph 315 may represent the number of surrounding vehicles in the vicinity of the host vehicle 100. Examples of vicinity may include a lateral distance, a longitudinal distance, or both. Thus, examples of vicinity may include, e.g., within one lane of the host vehicle 100, within two lanes of the host vehicle 100, within three lanes of the host vehicle 100, within 50 m of the host vehicle 100, within 100 m of the host vehicle 100, etc.

In situations where there are surrounding vehicles travelling in the same direction as the host vehicle 100, the velocity variation of surrounding vehicles may provide an additional measure of traffic complexity indication rather than considering only the density of traffic. A group of surrounding vehicles that travel at similar velocities relative to the host vehicle 100 may be relatively easier to deal with (e.g., less complex traffic) than when one or more surrounding vehicles travel at a much higher velocity than the host vehicle 100.

Equation 1, below, may be used to calculate the velocity variation of surrounding vehicles $$\text{index}_{long}(t) = \text{var}(V_i(t)) \cdot n, i = 1 \ldots n \quad (1)$$

where $V_i$ is the velocity of the $i^{th}$ surrounding vehicle and n is the total number of vehicles detected. In Equation 1, the traffic density may be taken into account by the multiple n.

Figure 4:
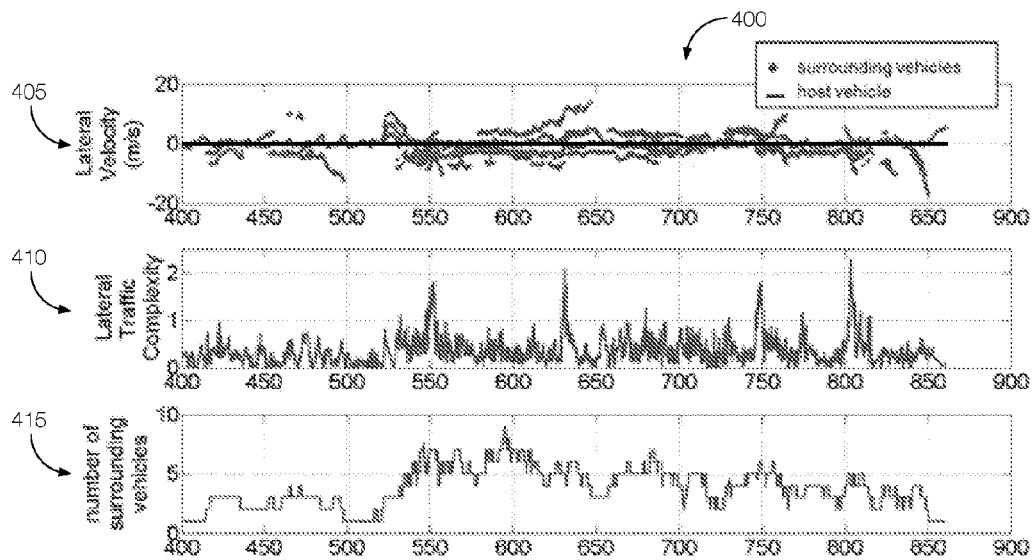
FIG. 4 illustrates example graphs related to estimating a lateral component of a traffic complexity index.

FIG. 4 illustrates example graphs 400 related to estimating a lateral component of a traffic complexity index. The graphs 400 include a lateral velocity graph 405, a lateral traffic complexity graph 410, and a number of surrounding vehicles graph 415. The lateral velocity graph 405 may represent values associated with the lateral speeds of the surrounding vehicles, the host vehicle 100, or both. The lateral traffic complexity graph 410 may represent the instantaneous lateral complexity values of the surrounding traffic relative to the host vehicle 100. The number of surrounding vehicles graph 415 may represent the number of surrounding vehicles in the vicinity of the host vehicle 100. Examples of vicinity may include a lateral distance, a longitudinal distance, or both. Thus, examples of vicinity may include, e.g., within one lane of the host vehicle 100, within two lanes of the host vehicle 100, within three lanes of the host vehicle 100, within 50 m of the host vehicle 100, within 100 m of the host vehicle 100, etc.

Large surrounding vehicle lateral velocity may represent a change in traffic pattern, and thus, a more complex traffic situation. Instead of using variance, however, the lateral traffic complexity may use a summation of surrounding vehicle lateral velocity as shown in graph 405 and represented in Equation 2, below.

$$\text{index}_{lat}(t) = \sum_{i=1}^{n} \text{abs}(v_i(t)) \cdot w(d), \qquad (2)$$

$$i = 1 \ldots n$$

where w(d) is a weighting function that may emphasize proximity to the host vehicle 100. That is, lateral movement of surrounding vehicles with closer proximity to the host vehicle 100 may be given a greater weight than surrounding vehicles that are further away from the host vehicle 100. An example weighting function w(d) may be determined in accordance with Equation 3.

$$\begin{cases} w(d) = 1, & \text{if } d \leq 1 \\ w(d) = \dfrac{1}{d}, & \text{otherwise} \end{cases} \qquad (3)$$

where d is the lateral distance of a vehicle relative to the host vehicle 100.

Figure 5:
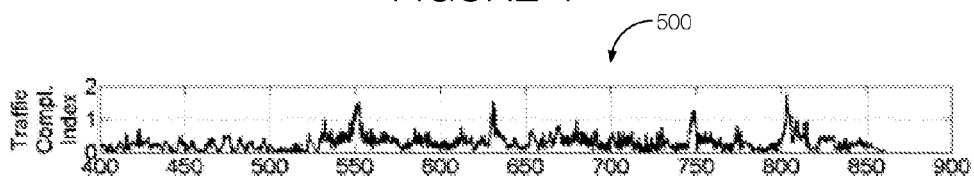
FIG. 5 is an example graph of the traffic complexity index based on the longitudinal and lateral components in the example graphs of FIGS. 3 and 4.

FIG. 5 illustrates an example graph 500 of an estimated traffic complexity index. The traffic complexity index includes an aggregation of the longitudinal complexity values and the lateral complexity values discussed above with reference to FIGS. 3 and 4. In one possible implementation, the traffic complexity index may be defined in accordance with Equation 4.

$$\text{index}(t) = \alpha \cdot \text{index}_{long} + \beta \cdot \text{index}_{lat} \qquad (4)$$

where α and β represent weights applied to the longitudinal complexity index and lateral complexity index, respectively.

The example graph 500 may provide richer information concerning traffic conditions than traffic density alone. Also, with the traffic complexity index, the demand prediction system 105 may predict potential changes of traffic patterns that may necessitate the driver's increased attention or intervention. The traffic complexity index may be used for driving demand prediction when the host vehicle 100 is operating in a non-autonomous or semi-autonomous mode as well as notifications for the driver to elevate his or her engagement when the host vehicle 100 is operating in a semi-autonomous or fully autonomous mode.

Figure 6:
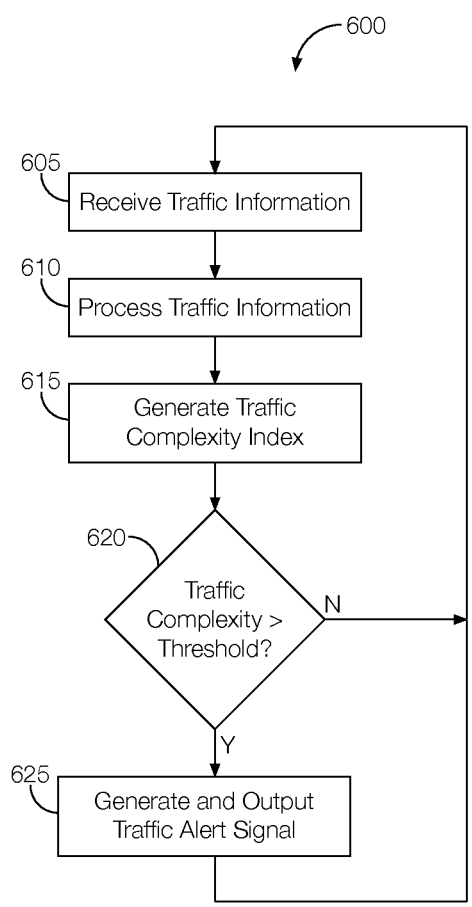
FIG. 6 is a flowchart of an example process that may be executed by the vehicle system to predict a change in driving demand.

FIG. 6 is a flowchart of an example process 600 that may be executed by the vehicle system to predict a change in driving demand. The process 600 may be initiated when, e.g., the host vehicle 100 is turned on or begins operating in an autonomous or semi-autonomous mode. Therefore, the process 600 may apply to autonomous, semi-autonomous, or non-autonomous operation of the host vehicle 100.

At block 605, the demand prediction system 105 may receive traffic information. Examples of traffic information may include the number of surrounding vehicles, the direction of travel of the surrounding vehicles, etc. The traffic information may be collected via the environmental sensors 110 and signals representing the traffic information may be transmitted to the processing device 115. The sensor fusion module 125, incorporated into the processing device 115, may receive the traffic information from the environmental sensors 110.

At block 610, the demand prediction system 105 may process the traffic information. The traffic information may be processed by, e.g., the processing device 115. In particular, the sensor fusion module 125 may extract longitudinal complexity values and lateral complexity values from the traffic information received from the environmental sensors 110 at block 605. The sensor fusion module 125 may output the longitudinal complexity values to the longitudinal complexity module 130 and the lateral complexity values to the lateral complexity module 135. The longitudinal complexity module 130 and the lateral complexity module 135 may process the respective traffic information as discussed above with respect to FIGS. 3 and 4, respectively. That is, the longitudinal complexity module 130 may generate the longitudinal complexity index from the longitudinal complexity values and the lateral complexity module 135 may generate the lateral complexity index from the lateral complexity values. The longitudinal and lateral complexity indices may be output to the traffic complexity module 140.

At block 615, the demand prediction system 105 may generate the traffic complexity index from the traffic information. For instance, the traffic complexity module 140 may receive and aggregate the longitudinal complexity values and the lateral complexity values. The traffic complexity module 140 may receive the longitudinal complexity values in the form of the longitudinal complexity index and the lateral complexity values in the form of the lateral complexity index. In one possible approach, the traffic complexity module 140 may weigh the longitudinal complexity values differently than the lateral complexity values. For instance, the traffic complexity module 140 may apply a greater weight to the lateral complexity values. Alternatively, the traffic complexity module 140 may apply a greater weight to the longitudinal complexity values. In other possible implementations, the traffic complexity module 140 may weigh the lateral complexity values and the longitudinal complexity values equally. Because using longitudinal and lateral complexity values and respective indices, the traffic complexity module 140 may generate the traffic complexity index based on the movement of the surrounding vehicles relative to the host vehicle 100.

At decision block 620, the demand prediction system 105 may compare the traffic complexity index to a predetermined threshold. For instance, the processing device 115, via the traffic complexity module 140, may determine whether the traffic complexity index indicates a level of traffic complexity that exceeds the threshold. If the traffic complexity index exceeds the predetermined threshold, the process 600 may proceed to block 625. In some instances, the process 600 may proceed to block 625 if the traffic complexity index exceeds the predetermined threshold a predetermined number of times to avoid unnecessarily alerting the driver of fleeting traffic issues. If the traffic complexity index does not exceed the predetermined threshold, or if the traffic complexity index has not exceeded the predetermined threshold a minimum number of times, the process 600 may return to block 605.

At block 625, the demand prediction system 105 may generate and output the traffic alert signal. The traffic alert signal may be generated by the processing device 115 via the traffic complexity module 140. In some instances, the traffic alert signal may indicate that a situation requiring increased driving demand has been detected. The traffic complexity module 140 may output the traffic alert signal to the user interface device 120 with a command for the user interface device 120 to present an alert to the driver. The alert may include an audible alert, a visible alert, a tactile alert, or the like.

The process 600 may end after block 625. Alternatively, as shown in FIG. 6, the process 600 may proceed to block 605 after block 625 and continue to repeat until the host vehicle 100 is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   at least one environmental sensor programmed to collect traffic information representing movement of a plurality of surrounding vehicles relative to a host vehicle; and
   a processing device programmed to receive the traffic information, generate a traffic complexity index based at least in part on the traffic information, compare the traffic complexity index to a predetermined threshold, and generate a traffic alert signal if the traffic complexity index exceeds the predetermined threshold,
   wherein the processing device is programmed to generate the traffic complexity index based at least in part on a longitudinal complexity value and a lateral complexity value,
   wherein the longitudinal and lateral complexity values are associated with the longitudinal and lateral movement, respectively, of the plurality of surrounding vehicles,
   wherein the processing device is programmed to generate the traffic complexity index by aggregating the longitudinal complexity value and the lateral complexity value from each of the plurality of surrounding vehicles.

2. The vehicle system of claim 1, wherein the processing device is programmed to weigh the longitudinal complexity value greater than the lateral complexity value.

3. The vehicle system of claim 1, wherein the processing device is programmed to weigh the lateral complexity value greater than the longitudinal complexity value.

4. The vehicle system of claim 1, wherein the processing device is programmed to output the traffic alert signal to a user interface device.

5. The vehicle system of claim 4, wherein the traffic alert signal includes a command for the user interface device to present at least one of an audible alert, a visible alert, and a tactile alert.

6. The vehicle system of claim 1, wherein the processing device is programmed to weigh the movement of the plurality of surrounding vehicles based on a proximity of each surrounding vehicle to host vehicle.

7. The vehicle system of claim 6, wherein the processing device is programmed to weigh movement of the surrounding vehicles closer to the host vehicle greater than movement of the surrounding vehicles further away from the host vehicle.

8. The vehicle system of claim 6, wherein lateral movement of the surrounding vehicles relative to the host vehicle is weighed greater than longitudinal movement of the surrounding vehicles relative to the host vehicle.

9. The vehicle system of claim 1, wherein the processing device is programmed to predict driving demand based at least in part on the traffic complexity index.

10. The vehicle system of claim 1, wherein the processing device is programmed to:
    separate the longitudinal complexity value and the lateral complexity value from the traffic information for each of the plurality of surrounding vehicles,
    aggregate the separated longitudinal complexity values for each of the surrounding vehicles,
    aggregate the lateral complexity values for each of the surrounding vehicles, and
    generate the traffic control index from the aggregated longitudinal complexity values and the aggregated lateral complexity values.

11. The vehicle system of claim 1, wherein the predetermined threshold is based at least in part on an amount of driver demand and workload caused by the movement of the plurality of surrounding vehicles.

12. A method performed by a processing device in a host vehicle, the method comprising:
    receiving traffic information representing movement of a plurality of surrounding vehicles relative to the host vehicle;
    extracting a longitudinal complexity value and a lateral complexity value for each of the plurality of surrounding vehicles from the traffic information;
    generating a traffic complexity index based at least in part on the traffic information;
    comparing the traffic complexity index to a predetermined threshold; and
    generating a traffic alert signal if the traffic complexity index exceeds the predetermined threshold, wherein the traffic complexity index is generated based at least in part on the longitudinal complexity values and the lateral complexity values, wherein generating the traffic complexity index includes aggregating the longitudinal complexity values for each of the plurality of surrounding vehicles and the lateral complexity values for each of the plurality of surrounding vehicles.

13. The method of claim 12, wherein generating the traffic complexity index includes weighing the aggregated lateral complexity values greater than the aggregated longitudinal complexity values.

14. The method of claim 12, further comprising outputting the traffic alert signal to a user interface device with a command for the user interface device to present at least one of an audible alert, a visible alert, and a tactile alert.

15. The method of claim 12, wherein the traffic complexity index is based at least in part on movement of surrounding vehicles relative to a host vehicle.

16. A vehicle system comprising:
    a user interface device;
    at least one environmental sensor programmed to collect traffic information associated with movement of a plurality of surrounding vehicles relative to a host vehicle, the movement including lateral movement and longitudinal movement; and
    a processing device programmed to receive the traffic information, extract a lateral complexity value for each of the plurality of surrounding vehicles from the traffic information, extract a longitudinal complexity value for each of the plurality of surrounding vehicles from the traffic information, generate a traffic complexity index by aggregating the lateral and longitudinal complexity values, compare the traffic complexity index to a predetermined threshold, and generate a traffic alert signal if the traffic complexity index exceeds the predetermined threshold,
    wherein the processing device is programmed to output the traffic alert signal to the user interface device and wherein the user interface device is programmed to generate at least one of an audible alert, a visible alert, and a tactile alert in response to receiving the traffic alert signal.

* * * * *